United States Patent [19]

Shimada et al.

[11] Patent Number: 4,603,081
[45] Date of Patent: Jul. 29, 1986

[54] MAGNETIC RECORDING MEDIUM

[75] Inventors: Shigeru Shimada, Saku; Yuichi Kubota; Masaharu Nishimatsu, both of Komoro, all of Japan

[73] Assignee: TDK Corporation, Tokyo, Japan

[21] Appl. No.: 657,004

[22] Filed: Oct. 2, 1984

[30] Foreign Application Priority Data

Oct. 4, 1983 [JP] Japan .................. 58-184536

[51] Int. Cl.$^4$ .............................. G11B 5/70
[52] U.S. Cl. .................. 428/336; 252/62.54; 360/134; 360/135; 360/136; 427/44; 427/128; 428/480; 428/522; 428/694; 428/900
[58] Field of Search .............. 428/694, 695, 425.9, 428/336, 900, 480, 522; 427/44, 128; 360/134–136; 252/62.54

[56] References Cited

U.S. PATENT DOCUMENTS

| | | | |
|---|---|---|---|
| 4,415,630 | 11/1983 | Kubota | 428/900 |
| 4,448,846 | 5/1984 | Chang | 427/44 |
| 4,476,035 | 10/1984 | Miyoshi | 428/900 |
| 4,559,265 | 12/1985 | Kubota | 428/900 |
| 4,560,617 | 12/1985 | Nishimatsu | 428/900 |

FOREIGN PATENT DOCUMENTS 0128711  8/1982  Japan .................. 428/900

Primary Examiner—Ellis P. Robinson
Attorney, Agent, or Firm—Wyatt, Gerber, Shoup, Scobey and Badie

[57] ABSTRACT

A magnetic recording medium, produced by preparing a resin solution for magnetic paint containing a mixture of a radiation curable resin modified copolymer of (A) vinyl chloride, (B) a vinyl carboxylate, (C) vinyl alcohol, (D) an unsaturated carboxylic acid and (E) an unsaturated carboxylic anhydride, containing 50 to 90% by weight of (A) based on the total of the amounts of (A), (B) and (C), 0 to 30% by weight of (E) based on the total of the amounts of (D) and (E), and 1 to 5 parts by weight of the total of (D) and (E) based on 100 parts by weight of the total of (A), (B) and (C) and having an average polymerization degree of 100 to 400 and an other radiation curable resin, and a magnetic powder, applying the resultant magnetic paint to a nonmagnetic substrate, and curing the applied layer of paint with radiation.

11 Claims, 1 Drawing Figure

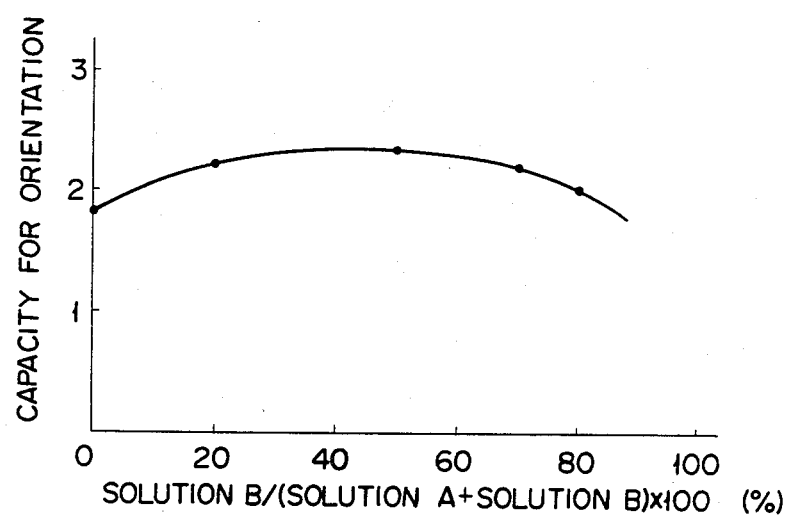

MAGNETIC RECORDING MEDIUM

BACKGROUND OF THE INVENTION

1. Field of the Invention

This invention relates to a magnetic recording medium. More particularly, this invention relates to a magnetic recording medium with outstanding surface and high electromagnetic properties produced by blending a radiation curable resin obtained by modifying a copolymer of vinyl chloride, a vinyl carboxylate, vinyl alcohol, an unsaturated carboxylic acid and a carboxylic anhydride, and other polymer and a magnetic powder, applying the resultant magnetic paint to a nonmagnetic substrate, and curing the applied layer of paint with radiation.

2. Description of Prior Art

Magnetic recording media are used extensively in the form of magnetic tapes for audio and video recording, magnetic disks for computers and word processors, and magnetic cards for other household appliances, for examples. In the production of such magetic recording media, the practice of effecting fast adhesion of magnetic powder formulations to their substrates by using a radiation-sensitive curing resin as a binder and crosslinking and polymerizing this binder with radiation is now in vogue.

Magnetic recording media using the aforementioned radiation curable resin as the binder, however, have suffered from the disadvantages that they have high friction coefficients and are still deficient in surface properties such as gloss, orienting properties and electromagnetic properties. As a solution to these disadvantages, we previously described a resin solution for magnetic paint having as a main component thereof a copolymer of (A) vinyl chloride, (B) a vinyl carboxylate, (C) an unsaturated carboxylic acid and (D) an unsaturated carboxylic anhydride, containing 50 to 80% by weight of (A) based on the total of the amounts of (A) and (B), 0 to 30% by weight of (E) based on the total of the amounts of (D) and (E), and 1 to 5 parts by weight of the total of (D) and (E) based on 100 parts by weight of the total of (A) and (B) and having an average polymerization degree of 100 to 400 (Japanese Patent Open No. SHO 57(1982)-128,711). The magnetic recording media using the solution mentioned above, however, are still unsatisfactory in terms of friction coefficient, gloss, orienting property, electromagnetic property, etc.

An object of this invention, therefore, is to provide an improved magnetic recording medium.

Another object of this invention is to provide a magnetic recording medium which has a low friction coefficient and is excellent in surface, orienting and electromagnetic properties.

SUMMARY OF THE INVENTION

The objects described above are accomplished by a magnetic recording medium which is produced by preparing a resin solution for magnetic paint containing a mixture of a radiation curable resin modified a copolymer of (A) vinyl chloride, (B) a vinyl carboxylate, (C) vinyl alcohol, (D) an unsaturated carboxylic acid and (E) an unsaturated carboxylic anhydride, containing 50 to 90% by weight of (A) based on the total the amounts of (A), (B) and (C), 0 to 30% by weight of (E) based on the total of the amounts of (D) and (E), and 1 to 5 parts by weight of the total of (D) and (E) based on 100 parts by weight of the total of (A), (B) and (C) and having an average polymerization degree of 100 to 400 and another polymer and a magnetic powder, applying the resultant magnetic paint to a non-magnetic substrate, and curing the applied layer of paint with radiation.

BRIEF DESCRIPTION OF THE DRAWINGS

FIGURE is a graph showing relation between capacity for orientation and ratio of each component.

PREFERRED EMBODIMENT OF THE INVENTION

The radiation curable resin used in this invention is a radiation curable resin obtained by modifying a copolymer resin of (A) vinyl chloride, (B) a vinyl carboxylate, (C) vinyl alcohol, (D) an unsaturated carboxylic acid and (E) an unsaturated carboxylic anhydride, having an average polymerization degree of 100 to 400.

To cite concrete examples of the monomers which are copolymerized with (A) vinyl chloride, those of (B) the vinyl carboxylate are vinyl acetate, vinyl propionate and Vinyl Versatate (proprietary name for Shell product), vinyl acetate being a preferred choice; those of (D) the unsaturated carboxylic acid are maleic acid, itaconic acid, fumaric acid, acrylic acid and methacrylic acid, maleic acid being a preferred choice; and those of (E) the unsaturated carboxylic anhydride are maleic anhydride and itaconic anhydride, maleic anhydride being a preferred choice.

In the aforementioned copolymer, (A) vinyl chloride is contained in an amount of 50 to 90% by weight, preferably 70 to 85% by weight, based on the total of the amounts of (A) vinyl chloride and (B) the vinyl carboxylate. If the amount of (A) vinyl chloride based on the aforementioned total exceeds 90% by weight, the solution obtained by mixing the copolymer with the magnetic powder acquires higher viscosity than is desirable so that the magnetic paint, prior to application to the substrate, is required to have its viscosity lowered by the use of a large amount of solvent. If the amount of (A) vinyl chloride based on the aforementioned total is less than 50% by weight, the applied layer of paint has less strength than desirable, with the possible result that the layer will peel off or undergo blocking. Then, (E) the unsaturated carboxylic anhydride is present in an amount of 0 to 30% by weight, preferably 1 to 10% by weight, based on the total of the amounts of (D) the unsaturated carboxylic acid and (E) the unsaturated carboxylic anhyudride. If the amount of (E) the unsaturated carboxylic anhydride based on the aforementioned total exceeds 30% by weight, the dispersibility of the magnetic powder in the copolymer resin solution is lower than is desirable. Further in the aforementioned copolymer, the total of the amounts of (D) the unsaturated carboxylic acid and (E) the unsaturated carboxylic anhydride is in the range of 1 to 5 parts by weight, preferably 1 to 4 parts by weight, based on 100 parts by weight of the total of (A) vinyl chloride, (B) vinyl alcohol and (C) the vinyl carboxylate. If the total is less than 1 part by weight, the dispersibility of the magnetic powder decreases. If the total exceeds 5 parts by weight, the paint will gel so that the magnetic paint has too short pot life to suit actual use.

The average polymerization degree of the aforementioned vinyl chloride copolymer is limited to the range of 100 to 400. The reason for this range of average polymerization degree is that when the copolymer is converted into the magnetic paint and, in that form, applied to the substrate, the surface of the applied layer of paint is too weak to withstand actual use if the average polymerization degree of the copolymer is less than 100 and the magnetic paint has such a high viscosity that the work of application is too difficult if the average polymerization degree exceeds 400. In due consideration of the quality of the applied layer of paint and the condition of the paint, the aforementioned copolymer proves desirable particularly when it has an average polymerization degree in the range of 200 to 400.

The above-mentioned copolymer is subjected to radiation curing modification. Such resin so prepared proves more desirable from the standpoint of the speed of curing. The radiation curing modification can be effected, for example, by incorporating into the molecule an acrylic double bond compound such as acrylic acid, methyacrylic acid or esters thereof which possess a radically polymerizable unsaturated double bond, an allyl type double bond such as of diallyl phthalate, or an unsaturated bond such as of maleic acid or maleic acid derivatives, namely a group which induces cross-linking or polymerization desiccation upon exposure to radiation. Any other unsaturated double bond which is cross-linked and polymerized by exposure to radiation may be simularly usable.

In the present invention, a mixture of the above-mentioned radiation curable copolymer and another polymer is used, and the amount of the radiation curable copolymer is 10 to 80% by weight, preferably 20 to 70% by weight based on the total of the radiation-sensitive curing modified copolymer and the other polymer. That is to say, if the ratio of the radiation curable copolymer is less than 10% by weight or more than 70% by weight, capacity for orientation decreases, and if it is more than 80% by weight, crosslinking density increases, so the coated film becomes hard and the coated film itself becomes brittle. The other resins to be incorporated are non-radiation curable resin and other radiation curable resin except the above mentioned ones.

Concrete examples of the non-radiation curable resins are as follows:

(1) Vinyl chloride type copolymers

Vinyl chloride-vinyl acetate-vinyl alcohol copolymer, vinyl chloride-vinyl alcohol copolymer, vinyl chloride-vinyl alcohol-vinyl propionate copolymer, vinyl chloride-vinyl acetate-maleic acid copolymer, and vinyl chloride-vinyl acetate-terminal OH side chain alkyl group copolymer. Commercially available vinyl chloride type copolymers are produced by Union Carbide Corp. and marketed under trademark designations VROH, VYNC, VYEGX and VERR, for example.

(2) Saturated polyester resins

Saturated polyester resins obtained by the reaction of such saturated polybasic acids as phthalic acid, isophthalic acid, terephthalic acid, succinic acid, adipic acid and sebacic acid with such polyhydric alcohols as ethylene glycol, diethylene glycol, glycerol, trimethylol propane, 1,2-propylene glycol, dipropylene glycol, 1,3-butane diol, 1,4-butane diol, 1,6-hexane diol, pentaerythritol, sorbitol, neopentyl glycol and 1,4-cyclohexane dimethanol. Resins obtained by modifying those saturated polyester resins mentioned above such as with SO$_3$Na (Bylon 53S, for example) are also examples.

(3) Polyvinyl alcohol type resins

Polyvinyl alcohol, butyral resin, acetal resin, formal resin and copolymers thereof.

(4) Epoxy type resins

Epoxy resins obtained by the reaction of bisphenol A with epichlorohydrin or methyl epichlorohydrin (such as products of Shell Chemical marketed under trademark designations of Epikote 152, 154, 828, 1001, 1004 and 1007, products of Dow Chemical marketed under trademark designations of DEN 431, DER 732, DER 511 and DER 331, and products of Dainippon Ink And Chemicals, Inc. marketed under trademark designations of Epicron 400 and Epicron), phenoxy resins which are high polymer resins of the aforementioned epoxy (such as products of Union Carbide marketed under trademark designations of PKHA, PKHC and PKHH), and copolymers of brominated bis-phenol A with epichlorohydrin (such as products of Dainippon Ink And Chemicals, Inc. marketed under trademark designations of Epicron 145, 152, 153 and 1120).

(5) Cellulose derivatives

Cellulose derivatives of varying molecular weights are also effectively used as thermoplastic components. Among other cellulose derivatives, nitrocellulose, cellulose acetobutyrate, ethyl cellulose, buthyl cellulose and acetyl cellulose prove particularly desirable.

(6) Others

Polyfunctional polyester resins, polyether ester resins, polyvinyl pyrrolidone resin and derivatives thereof (such as vinyl pyrrolidone-ethylene copolymer), polyamide resin, polyimide resin, phenol resin, spiroacetal resin and hydroxyl group-containing acrylic and methacrylic resins are also usable.

In the curing resins not sensitive to radiaiton enumerated above, those which are thermoplastic are preferred over the others. In view of the compatibility with the aforementioned radiation curable copolymer, a vinyl chloride type copolymer is preferable. Further, the aforementioned five-component type copolymer in its unmodified form proves to be the best choice from the viewpoint of compatibility.

Such other radiation curable resin is obtained by modifying the aforementioned polymer or copolymer (exclusive of the aforementioned five-component copolymer of vinyl chloride-vinyl carboxylate-vinyl alcohol-unsaturated carboxylic acid-unsaturated carboxylic anhydride) into a radiation curable resin. This modification is effected, for example, by incorporation into the molecules of the polymer or copolymer such a radically polymerizable unsaturated double bond as acrylic double bond contained in acrylic acid, methacrylic acid, and esters thereof, allylic double bond contained in diallyl phthalate, or unsaturated double bond contained in maleic acid and maleic acid derivatives which is cured with cross-linking or polymerization by exposure to radiation. This radiation curable resin is a substitute for part of the aforementioned curing resin not sensitive to radiation and is used in a proportion such that the total amount of the radiation curable resin will not exceed 80% by weight, preferably 70% by weight, of the aforementioned total amount of resins.

The substances so far described are part of other polymer than the radiation sensitive modified five-component copolymer in accordance with the present invention.

Such a resin composition is enabled to give an applied layer of paint having further increased toughness by incorporating therein a thermoplastic elastomer or prepolymer.

This incorporation of the elastomer or prepolymer becomes more effective when the elastomer or prepolymer is similarly modified for radiation-sensitization.

Examples of the elastomer or prepolymer usable advantageously for the purpose of this invention are as follows.

(1) Polyurethane elastomers, prepolymers and telomers

Polyurethane elastomers are particularly effective in terms of wear resistance and adhesiveness to polyethylene terephthalate film.

Examples of such urethane compounds are polyuethane elastomers, prepolymers and telomers formed of polycondensates of various isocyanates such as 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, hexamethylene diisocyanate, isophorone diisocyanate, dicyclohexylmethane diisocyanate, Desmodur L and Desmodur N; linear saturated polyesters (such as polycondensates of polyhydric alcohols such as ethylene glycol, diethylene glycol, glycerol, trimethylol propane, 1,4-butane diol, 1,6-hexane diol, pentaerythritol, sorbitol, neopentyl glycol and 1,4-cyclohexane dimethanol with saturated polybasic acids such as phthalic anhydride, isophthalic acid, terephthalic acid, maleic acid, succinic acid and adipic acid); linear saturated polyethers (such as polyethylene glycol, polypropylene glycol and polytetramethylene glycol), and various polyesters such as caprolactam, hydroxyl-containing acrylates and hydroxyl-containing methacrylates.

Such an elastomer may be combined in its unaltered form with the aforementioned thermoplastic resin modified for radiation-sensitization. The elastomer may be used more effectively, however, when it is modified for radiation-sensitization by reaction with an acrylic double bond compound capable of reacting with the isocyanate group or hydroxyl group at the terminal of the polyurethane elastomer or with a monomer possessing such an acrylic double bond.

(2) Acrylonitrile-butadiene copolymer elastomers

The acrylonitrile-butadiene copolymer prepolymer having a terminal hydroxyl group produced by Sinclair Petrochemical Corp. and marketed under trademark designation of Poly-BD Liquid Resin and the elastomers produced by Nippon Geon Co., Ltd. and marketed under trademark designations of Hiker 1432J, etc. are particularly suitable as elastomer components because the double bonds in their butadiene moieties are capable of generating radicals and inducing cross-linking and polymerization upon exposure to radiation.

(3) Polybutadiene elastomers

The prepolymers having a low molecular weight and a terminal hydroxyl group produced by Sinclair Petrochemical Corp. and marketed under trademark designations of Poly-BD-Liquid Resin R-15, etc. are highly suitable in terms of compatibility with termoplastic resins. In the prepolymer, R-15, since a hydroxyl group forms the terminal group of the molecule, this prepolymer can be made to acquire improved sensitivity to radiation by addition of an acrylic unsaturated double bond to the molecular terminal. The prepolymer thus modified proves more advantageous as a binder.

Further, the cyclized polybutadiene (produced by Japan Synthetic Rubber Co., Ltd. and marketed under trademark designation of CBR-M 901) manifests an outstanding behavior when properly combined with a thermoplastic resin. Particularly, the cyclized polybutadiene has great capacity for inducing cross-linking and polymerization with unsaturated bond radicals upon exposure to radiation, a property inherent in polybutadiene. Thus, it enjoys an outstanding quality as a binder.

In the class of other thermoplastic elastomers and their prepolymers, preferred members are elastomers such as styrene-butadiene rubber, chlorinated rubber, acrylic rubber, isobutylene rubber and cyclization product thereof (such as the product of Japan Synthetic Rubber Co., Ltd. marketed under trademark designation of CIR 701), epoxy-modified rubber, and internally plasticized saturated linear polyester (such as the product of Toyo Spinning Co., Ltd. marketed under trademark designation of Byron #300). They may be effectively utilized when they are treated for radiation-sentizing modification.

These elastomers and prepolymers are incorporated with the aforementioned resin composition in an amount of not more than 30 parts by weight, preferably 5 to 20 parts by weight, most preferably 5 to 10 parts by weight per 100 parts by weight of the resin composition.

When a solvent is used in the preparation of the resin solution for the magnetic paint according to the present invention, it can be selected from the group consisting of ketones such as acetone, methylethyl ketone, methylisobutyl ketone and cyclohexanone, alcohols such as methanol, ethanol, isopropanol and butanol which cannot be used with any isocyanate type thermosetting binder, ethers such as tetrahydrofuran and dioxane, solvents such as dimethyl formamide, vinyl pyrrolidone and nitropropane, and aromatic hydrocarbon diluents or solvents such as toluene and xylene.

The substrate to which the magnetic paint is applied may be a polyethylene terephthalate type film which is currently utilized widely in magnetic recording media. When the finished magnetic recording medium is intended for an application requiring resistance to heat, the substrate may be a polyimide film or polyamideimide film. If the polyester type film is thin it is normally subjected to monoaxial orientation or biaxial orientation in advance.

The magnetic powder for use in this invention may be selected from among a wide variety of finely divided magnetic powders such as $\gamma$-$Fe_2O_3$, $Fe_3O_4$, Co-doped $\gamma$-$Fe_2O_3$, Co-doped $\gamma$-$Fe_2O_3$-$Fe_3O_4$ solid solution, $CrO_2$, Co type compound-absorbed $\gamma$-$Fe_2O_3$, Co type compound-absorbed $Fe_3O_4$ (inclusive of the intermediate oxide with $\gamma$-$Fe_3O_4$; the term "Co type compound" as used herein means cobalt oxide, cobalt hydroxide, cobalt ferrite, or cobalt ion adsorbate which is capable of effectively utilizing the magnetic anisotropy of cobalt for improvement of coercive force), and combinations formed preponderantly of such ferromagnetic metal elements as Co, Fe-Co, Fe-Co-Ni and Co-Ni. The preparation of the magnetic powder can be effected by the wet reduction method using a reducing agent such as $NaBH_4$ or the method which comprises the steps of treating the surface of iron oxide with a Si compound and then subjecting the treated iron oxide to dry reduction such as with hydrogen gas or to vacuum evaporation under a current of low-pressure argon gas. Finely divided single-crystal barium ferrite can be also used.

The finely divided magnetic powder may be formed of acicular-shaped particles or granular particles. The choice between these two forms is made according to the nature of the use to which the finished magnetic recording medium is put. The acicular-shaped particles of the powder are desired to have an average major axis of 0.1 to 1 μm and an average minor axis of 0.02 to 0.1 μm. The granular particles of the powder are desired to have an average particle diameter of 0.01 to 0.5 μm. The finely divided magnetic powder is incorporated in an amount of 300 to 500% by weight, preferably 400 to 450% by weight, based on the total amount of the aforementioned resin.

The aforementioned resin composition and the magnetic powder are throughly kneaded and dispersed in a suitable device such as, for example, a ball mill, a sand grind mill, a roll mill, a high-speed impeller dispersion machine, a homogenizer or a supersonic-wave dispersion machine, to produce a magnetic paint. This magnetic paint is applied by an ordinary method to a nonmagnetic substrate. The thickness of the applied layer of the paint is 5 to 20 μm, preferably 0.5 to 10 μm, on dry basis.

The ionizing energy of an electron beam accelerator is especially useful to generate cross linking. Optionally, however, the γ ray originating in $Co^{60}$, the β ray originating in $Sr^{90}$, or the X ray originating in an X-ray generator may be effectively used.

The electron beam accelerator is particularly advantageous because of the ease with which the dosage of absorbed ray is controlled, and with which the ionization radiation for the introduction into the production line is automatically shielded. Moreover, the connection between the various facilities in the production line and the sequence control unit is easily effected. To date, various electron beam accelerators have been developed, such as the Cockcroft type accelerator, the Van de Graaf type accelerator, the interchangeable transformer type accelerator, the iron core insulation transformer type accelerator and the linear accelaerator. They vary one from another mainly in the manner for generating high voltage. Most magnetic recording media intended for general-purpose applications have low magnetic layer thicknesses not exceeding 10 microns. A high-speed voltage exceeding 1000 kV normally used in the aforementioned accelerators are not useful for the production of such magnetic recording media. Thus, an electron beam accelerator rated for a low accelerated voltage of 300 kV or less suffices for the irradiation contemplated in this invention. This accelerator of such a low accelerated voltage is further advantageous in respect of the cost required for the purchase of a shielding device against the ionizing radiation as well as for the cost of the system itself.

The advantage in terms of the cost of the sheilding device is indicated in Table 1.

TABLE 1

| Accelerated voltage and thickness of shield | | |
|---|---|---|
| Accelerated voltage (kV) | Shielding material | Shield thickness (cm) |
| 150 | Lead | 0.5 |
| 200 | Lead | 2 |
| 300 | Lead | 3 |
| 500 | Concrete | 85 |
| 750 | Concrete | 115 |
| 1,000 | Concrete | 125 |
| 2,000 | Concrete | 175 |
| 3,000 | Concrete | 190 |

[Source: Report of Radiation Utilization Study Meeting, page 8 (August, 1979 Japan Atomic Energy Forum)]

It is noted from Table 1 that in the electron beam accelerator of not more than 300 kV of accelerated voltage, use of lead plates (3 cm in maximum thickness) as a shield to enclose the entire accelerator tube encircling the site of irradiation will suffice for complete interception of X-ray leak. Thus, there is no need for erecting an expensive electron ray irradiation chamber exclusively for shielding leaks, and the system itself can be incorporated as one unit in the whole production line for magnetic recording media. Consequently, the drying and curing of magnetic tapes or magnetic sheets with an electron ray can be carried out in a continuous line.

Concrete examples of the system advantageously used in this invention include a low voltage type electron beam accelerator produced by Energy Science, Inc. (ESI) of the United States marketed under trademark designation of Electro-curtain System, an electron beam accelerator produced by RPC Corp. and marketed under trademark designation of Broad-beam System, and a self-shielding type scanning low voltage type electron accelerator produced by Polymer Physik of West Germany. When the aforementioned applied layer of binder is cured using a low voltage accelerator of 150 to 300 kV, if the dosage of absorbed ray exceeds 5 Mrads, the magnetic recording media for audio and memory applications suffer from increased deposition of peeled magnetic film on the recording heads and those for video applications suffer from similarly increased deposition on the rotary cylinders, both to the extent of impairing the durability of media in the course of use under conditions of high temperature and high humidity. When the dosage of absorbed ray is in the range of 0.5 to 5 Mrads, the polymerization and the cross-linking caused by the irradiation with the electron ray occur in densities proper for the applied layer of magnetic paint to aquire flexibility and rigidity in suitable balance, exhibit improved resistance to wear due to friction of the magnetic layer against the recording head, and preclude deposition of peeled magnetic film on the head or on the cylinder. Thus, the magnetic recording medium consequently obtained exhibits outstanding performance.

As concerns the cross-linking of the binder in the applied layer of magnetic paint, it is important that the layer of magnetic paint on the substrate should be exposed to radiation under a current of an inert gas such as nitrogen or helium. As is often the case with any applied layer containing a magnetic pigment in an extremely high concentration, the applied layer of magnetic paint containing a high density of magnetic powder inevitably assumes a highly porous texture. If this layer is exposed to radiation in air, the radiation for inducing the cross-linking of the binder gives rise to ozone in the air and, as the result, the radicals generated in the polymer are impeded by this ozone from effectively fulfilling their function of causing the cross-linking reaction. The ozone has its adverse effect not simply on the surface of the applied layer of magnetic paint but equally on the deep interior of the applied layer because of the porosity of texture, impeding the progress of the cross-linking of the binder. Thus, it is important that the immediate atmosphere enclosing the site of irradiation with the active energy ray should be filled with an inert gas such as nitrogen, helium or carbon dioxide having the highest tolerable oxygen concentration of 1%, preferably not more than 3,000 ppm.

Now, the present invention will be described more specifically below with reference to a working example.

EXAMPLE 1

Five component copolymer (degree of polymerization of 300) containing the following monomers is called resin A:

| (A) | Vinyl chloride | 70 parts by weight |
|---|---|---|
| (B) | Vinyl acetate | 20 parts by weight |
| (C) | Vinyl alcohol | 8 parts by weight |
| (D) | Maleic acid | 1.5 parts by weight |
| (E) | Maleic anhydride | 0.5 part by weight |

Into a four-necked flask, 750 parts by weight of the resin A, 1250 parts by weight of toluene and 500 parts by weight of cyclohexane were charged and dissolved with heating. After elevating the temperature to 80° C., 61.4 parts by weight of 2-hydroxyethyl methacrylate adduct of tolylene diisocyanate* (Refer the following method) was added and then 0.012 part by weight of tin octylate and 0.012 part by weight of hydroquinone. The reaction was carried out in a nitrogen atmosphere at a temperature of 80° C. until conversion of NCO reached not less than 90%.

*Method for preparation of 2-hydroxyethyl methacrylate (2HEMA) adduct of tolylene dissocyanate (TDI)

After finishing the reaction, it was diluted with 1250 parts by weight of methylethylketone to produce Solution A.

Under a current of $N_2$, 348 parts of tolylene diisocyanate was heated to 80° C. in a four-necked flask having an inner volume of 1 liter. While controlling internal temperature in the reaction vessel in the range of 80° to 85° C. by cooling, 260 parts of 2-hexaethylene methacrylate, 0.07 part of tin octylate and 0.05 part of hydroquinone were added dropwise. After completion of the addition, the resulting mixture was stirred at 80° C. for three hours to bring the reaction to completion. After completion of the reaction, the reaction mixture was removed from the reaction vessel and cooled. Consequently, there was obtained a white pasty 2-HEMA of TDI.

In a ball mill, the components described below were mixed for three hours so that the needle-shaped particles of magnetic iron oxide were thoroughly wetted with the dispersant.

| | |
|---|---|
| Cobalt-coated acicular-shaped particles of γ—$Fe_2O_3$ (major axis 0.5 μm, minor axis 0.05 μm, Hc 600 Oe) | 120 parts by weight |
| Carbon black (antistatic grade, Mitsubishi Carbon Black MA 600) | 5 parts by weight |
| Powdered α—$Al_2O_3$ (average particle diameter 0.5 μm) | 2 parts by weight |
| Dispersant (lecithin isolated from soybean oil) | 3 parts by weight |
| Solvent (methylethyl ketone/toluene: 50/50) | 100 parts by weight |

Then, the following components were thoroughly mixed and dissolved.

| | |
|---|---|
| Solution A (calculated as solids) (polymerization degree about 250) | 6 parts by weight |
| Butyral resin incorporating acrylic double bond | 9 parts by weight |
| Polyether urethane elastomer incorporating acrylic double bond (calculated as solids) | 15 parts by weight |
| Solvent (methylethyl ketone/toluene: 50/50) | 200 parts by weight |
| Fatty acid ester (butyl myristate) | 2 parts by weight |
| Fatty acid (myristic acid) | 1 part by weight |

The resultant solution was added to the ball mill used for the treatment of the magnetic powder and again was mixed for 42 hours.

The magnetic paint thus obtained was applied to the surface of a polyester film 15 μm in thickness, oriented over a permanent magnet (1,600 gausses), dried with an infrared ray lamp or hot air to expel the solvent, treated to smoothen the surface, and irradiated with an electron ray using an electron curtain type electron beam accelerator of ESI under the conditions of 150 kV of accelerated voltage, 10 mA of electrode current, and 5 Mrad of dosage under a blanket of nitrogen gas having a residual oxygen concentration of 500 ppm to effect polymerization desiccation and curing of the applied layer of magnetic paint.

The tape thus obtained was cut into strips of a width of ½ inch to produce video tapes. The video tapes thus obtained were tested for various properties. The results were as shown in Table 2. For comparison, the procedures were repeated, except that the incorporation of the Solutions A and B were omitted (Control 1) and the incorporation of the Solution B was omitted (Control 2). The results of these comparative tests are also shown in Table 2.

TABLE 2

| Physical property | Control 1 | Control 2 | Example 1 |
|---|---|---|---|
| Friction coefficient | 0.3 | 0.3 | 0.20 |
| Gloss (%) | 100 | 100 | 160 |
| Electromagnetic conversion property (dB) | 0 | 0 | +1.9 |

The friction coefficient ($\mu$) was determined by winding a given magnetic tape on a friction cylinder, running the tape, measuring the inlet tension $T_o$ and the outlet tension $T_i$ of the tape in motion, and applying the results of the measurement to the following Euler's formula.

$$\mu = (1/\theta) \cdot \ln (T_i/T_o)$$

(wherein $\theta$ stands for the angle of winding (rad.) and ln for the natural logarithm).

The gloss was determined by projecting a beam of light at 60° of incident angle upon the magnetic side of a given tape, measuring the reflected beam of light, and calculating the ratio of the volumes of incident light and reflected light. It was, therefore, reported by this ratio expressed in percent. The data of gloss shown in Table 2 are numerical values of the relative levels of rating of the samples, with the gloss of the sample of Example 1 taken as 2 (200%).

The data of electromagnetic conversion property are values (dB) measured with a VHS video deck at RF sensitively of 4 MHz and computed based on the property of the sample of the comparative test taken as 0 dB.

Various video tapes were prepared by varying the ratio (solid content) of Solutions A and B, and the capacity for orientations were tested to obtain the graph shown in the Figure.

EXAMPLE 2

A similar method as in Example 1 was carried out except that Fe-Co-Ni alloy magnetic powder (major axes 0.3 μm, minor axes 0.04 μm, Hc 1,200 Oe) was used instead of cobalt doped acicular γ-Fe$_2$O$_3$ and a mixed solvent of methylethyl ketone/toluene (52/48) was used as a solvent to obtain video tapes.

The video tapes thus obtained were tested for various properties. The results were as shown in Table 3. For comparision, the procedures were repeated, except the incorporation of Solution A and B were omitted (Control 3) and the incorporation of Solution B was omitted (Control 4). The results of these comparative tests are also shown in Table 3.

TABLE 3

| Physical property | Control 3 | Control 4 | Example 2 |
|---|---|---|---|
| Friction coefficient | 0.27 | 0.22 | 0.32 |
| Gloss (%) | 100 | 103 | 170 |
| Electromagnetic conversion property (dB) | 0 | 0 | +1.7 |

What is claimed is:

1. A magnetic recording medium, produced by preparing a resin solution for magnetic paint containing a mixture of a I radiation curable resin modified copolymer of (A) vinyl chloride, (B) a vinyl carboxylate, (C) vinyl alcohol, (D) an unsaturated caroxylic acid and (E) an unsaturated carboxylic anhydride, containing 50 to 90% by weight of (A) based on the total of the amounts of (A), (B) and (C), 0 to 30% by weight of (E) based on the total of the amounts of (D) and (E), and 1 to 5 parts by weight of the total of (D) and (E) based on 100 parts by weight of the total of (A), (B) and (C) and having an average polymerization degree of 100 to 400 and II another resin, and a magnetic powder, applying the resultant magnetic paint to a nonmagnetic substrate, and curing the applied layer of paint with radiation.

2. A magnetic recording medium according to claim 1, wherein the amount of magnetic powder is 300 to 500% by weight based on the total amount of resin.

3. A magnetic recording medium according to claim 2, wherein the amount of radiation curable resin is 10 to 80% by weight based on total weight of said radiation curable resin and another resin.

4. A magnetic recording medium according to claim 3, wherein the other resin is non radiation curable resin.

5. A magnetic recording medium according to claim 4, wherein the non radiation curable resin is vinyl chloride copolymer.

6. A magnetic recording medium according to claim 5, wherein the vinyl chloride copolymer is a vinyl chloride-vinyl carboxylate-vinyl alcohol-unsaturated carboxylic acid-unsaturated carboxylic anhydride copolymer.

7. A magnetic recording medium according to claim 1, wherein (B) said vinyl carboxylate is at least one member selected from the group consisting of vinyl acetate, vinyl propionate and Vinyl Versatate, (D) said unsaturated carboxylic acid is at least one member selected from the group consisting of maleic acid, itaconic acid, fumaric acid, acrylic acid and methacrylic acid and (E) said unsaturated carboxylic anhydride is at least one member selected from the group consisting of maleic anhydride and itaconic anhydride.

8. A magnetic recording medium according to claim 7, wherein (B) said vinyl carboxylate is vinyl acetate, (D) said unsaturated carboxylic acid is maleic acid and (E) said unsaturated carboxylic anhydride is maleic anhydride.

9. A magnetic recording medium according to claim 1, wherein said applied layer of magnetic paint has a thickness of 0.5 to 20 μm on dry basis.

10. A magnetic recording medium according to claim 7, wherein said non-magnetic substrate is a polyethylene terephthalate film.

11. A magnetic recording medium according to claims 1, 2, 3, 4, 5, 6, 7, 8, 9 or 10 wherein the magnetic paint also contains an elastomer.

* * * * *